Figure 1:
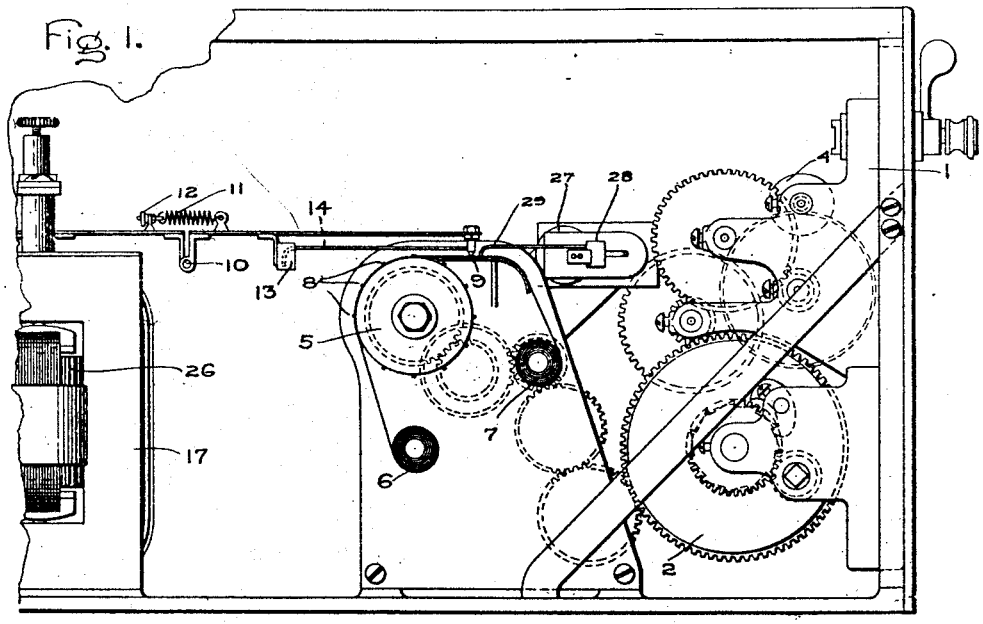

No. 882,586. PATENTED MAR. 24, 1908.
L. T. ROBINSON.
ELECTRICAL RECORDING INSTRUMENT.
APPLICATION FILED SEPT. 29, 1902.

3 SHEETS—SHEET 1.

Witnesses:
George A. Thornton
Benjamin B. Hull

Inventor:
Lewis T. Robinson,
by Albert G. Davis,
Att'y.

No. 882,586. PATENTED MAR. 24, 1908.
L. T. ROBINSON.
ELECTRICAL RECORDING INSTRUMENT.
APPLICATION FILED SEPT. 29, 1902.

3 SHEETS—SHEET 2.

Witnesses:
George A. Thornton.
B. B. Hull.

Inventor:
Lewis T. Robinson,
by Albert G. Davis
Atty.

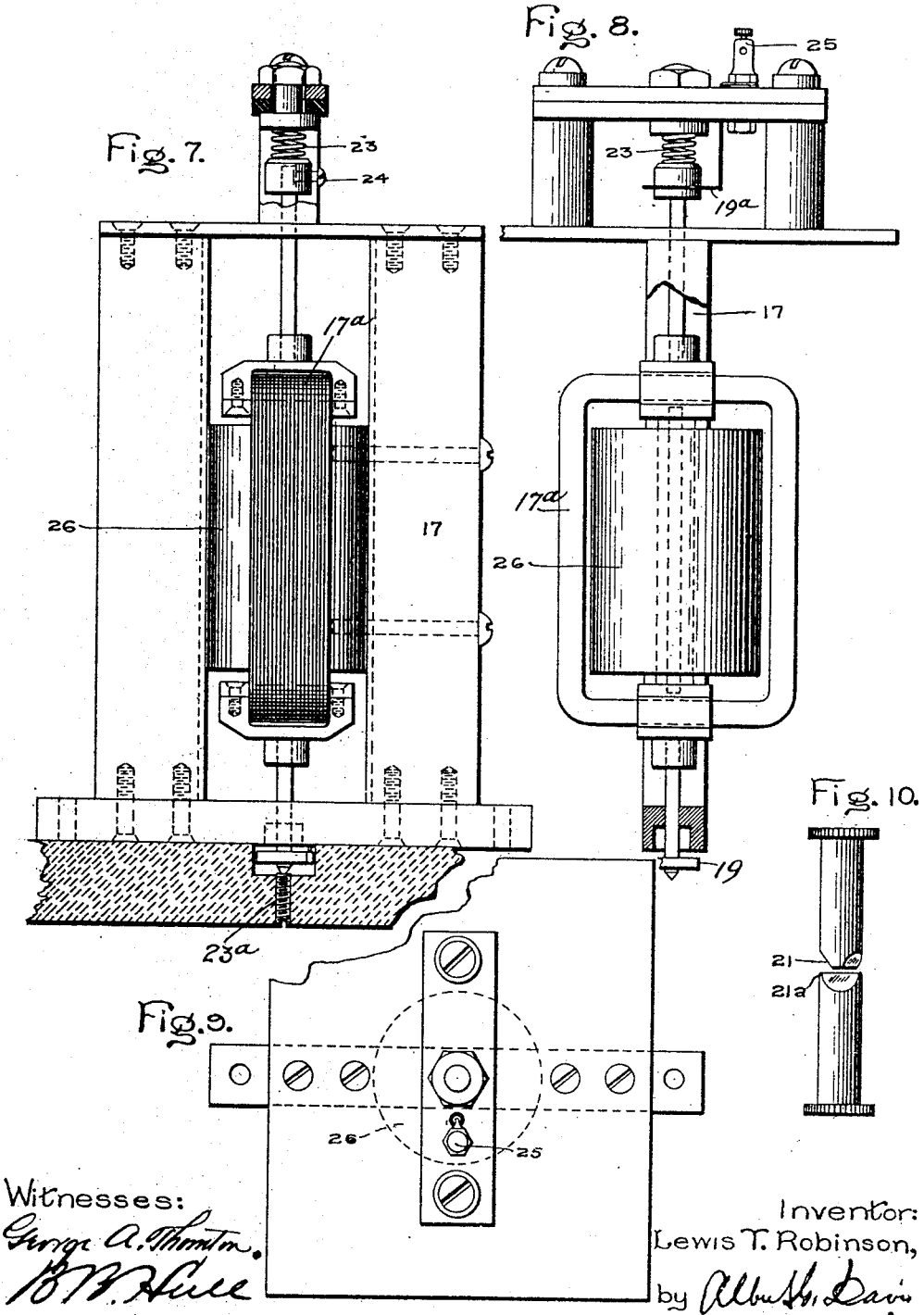

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

ELECTRICAL RECORDING INSTRUMENT.

No. 882,586.   Specification of Letters Patent.   Patented March 24, 1908.

Application filed September 29, 1902. Serial No. 125,194.

*To all whom it may concern:*

Be it known that I, LEWIS T. ROBINSON, a citizen of the United States, residing at Schenectady, county of Schenectady, State of New York, have invented certain new and useful Improvements in Electrical Recording Instruments, of which the following is a specification.

This invention relates to electric recording instruments for presenting a continuous record of changes in electric energy, such as current, potential or power.

The object of the invention is to provide an instrument which is more accurate than those commonly used. This end is accomplished by improving the mounting of the moving system, by lowering the frictional resistance of the recording pen or stylus, by giving the instrument sufficient torque to negative the errors due to friction, and by improving the damping mechanism so that the movements of the stylus under rapid changes may be rendered dead-beat.

In carrying out the invention I provide a motor for driving the recording strip of paper at a controllable speed, and for marking on the paper side by side with the record of electric measurements a time scale controlled by a clock. The recording style is a pen of peculiar construction in which the ink is drawn through a capillary tube from an ink-pot or well carried by the arm which carries the pen. The relations of the ink-well, feed pipe and stylus is such that the very slight siphonic tendency of the feed pipe is just about balanced by the resistance to flow due to its capillary bore. The flow of ink is, therefore, due entirely to the cohesion between the ink in the pen and the ink which wets the paper, and is always proportional to the length of the path that the pen traces. This is of course the ideal condition and the only condition under which freedom from "bleeding" is assured. By the term "siphon capillary feed" I mean to distinguish my pen from others which are not intended to and do not operate on this principle. The arm itself involves features of improvement in being provided with means for counterbalancing the weight and adjusting the pen in the best working relation to the record strip. The pen-carrying arm is provided with a magnetic damper comprising a body of metal moving throughout the range of deflection of the measuring arm within a magnetic field of force the damping value of which may be accurately gaged by adjustment of the reluctance of the circuit. This device comprises two tapered poles forming the gap limits within which the damper moves, axially adjustable so as to vary the area and distance apart, either or both, of confronting pole-surface at the limits of the gap or its axial position with respect to the disk.

The features of novelty of the invention will be more particularly described hereinafter and will be definitely indicated in the claims appended to this specification.

Figure 2:
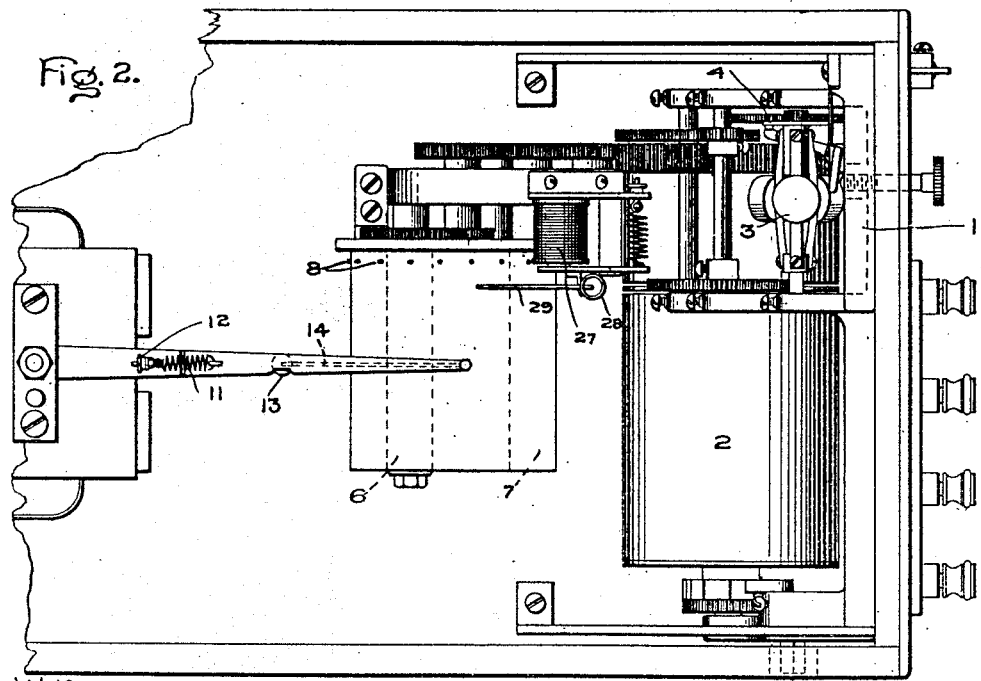
Figure 3:
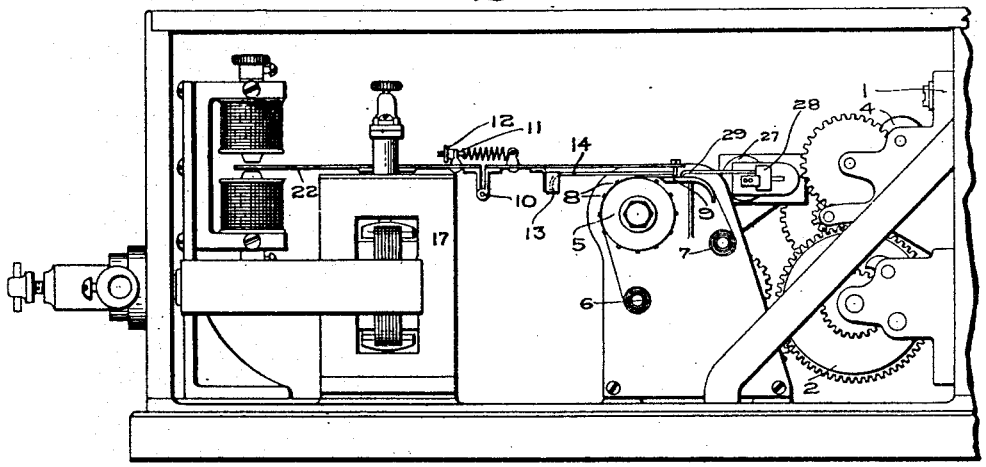
Figure 4:
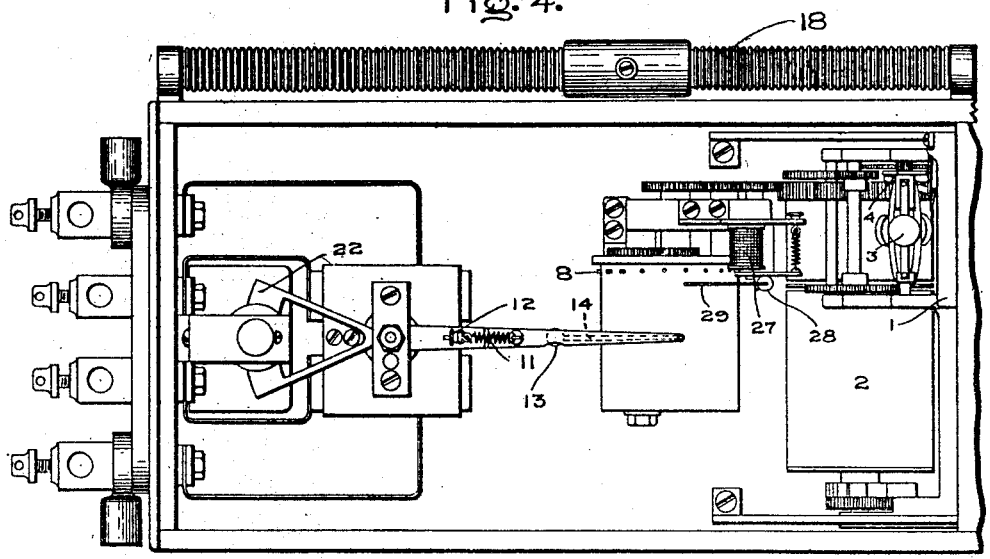
Figures 5, 6:
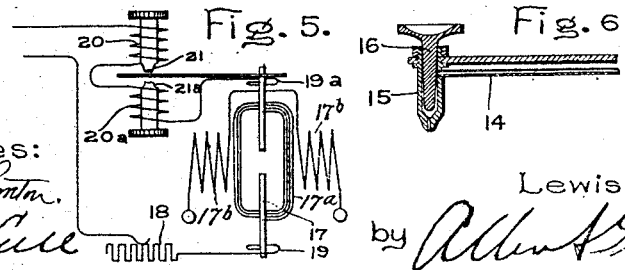

In the accompanying drawings, which illustrate the invention, Figure 1 is a side elevation, partly broken away, of an instrument embodying my improvements; Fig. 2 is a top plan view; Fig. 3 is a side elevation showing the complete instrument on a smaller scale than that illustrated in Figs. 1 and 2; Fig. 4 is a plan of Fig. 3; Fig. 5 is a diagrammatic representation of the controlling circuits; Fig. 6 is a sectional view on a magnified scale of the pen or recording style; Fig. 7 is an enlarged view of the measuring coils showing the method of mounting the movable system; Fig. 8 is a view at right angles to that indicated in Fig. 7; Fig. 9 is a top plan; and Fig. 10 is a detail of the magnet cores which form the damping field.

The instrument may be mounted within a suitable casing, as indicated in the drawings, the driving member which feeds the paper being of any approved type. Such an instrument is shown at 1 as a spring-impelled motor provided with a long spring to give a continuous run for a considerable length of time. Any other type of motor, as for example, an electric motor or a clock movement, might be employed for this purpose. The motor shown has a long spring barrel 2 for increase of driving capacity, and is provided with a governor 3 which, in combination with a friction disk 4, admits of easy regulation of speed. This motor *per se* is of a standard type, and involves no features of my improvements. The motor through a train of gears communicates motion at a suitable speed to a drum 5 over which a strip of paper is fed, being unwound from a reel 6 and wound up on a take-off reel 7. The paper is punched at the edge at distances to register with pins 8 fixed radially in the drum, being guided over a curved metal bench or table 9 provided with a flat face over which the measuring arm sweeps. This measuring arm is made of thin sheet metal, such as aluminium, and is jointed between the moving system and the stylus, as indicated by the hinge 10. The two members are connected by a light helical spring 11 capable of nice and delicate adjustment by a tension screw 12. The outer member of the arm carries a light ink well 13 which connects by a capillary tube 14 having thin walls with a recording stylus. The construction of this style is well shown in Fig. 6. The outer member of the measuring arm carries a light perforated stylus 15 provided at its tip with a bore of about 3 mils diameter and short in length, the opening in the body of the stylus being enlarged by a counterbore, as shown in the sectional view in Fig. 6, in which counterbore is seated a tapering plug 16 provided with a handle by which it may be withdrawn and inserted at will. The clearance between the pin and the walls of the counterbore is sufficient to just permit of free ink feed through the tube 14 to the tip of the fine bore in the stylus.

The ability to withdraw the plug 16 permits the pen to be readily cleaned in case of gumming or obstruction to the circulation of the ink, and since the supply tube for the stylus rests loosely on the edge or in a notch in the edge of the ink well it may be removed from the ink well and from the measuring arm by loosening a lock nut which holds the stylus to the measuring arm. The cleaning of the supply tube is facilitated by this construction. The supply tube or feed pipe is curved so that its open end is near the bottom of the ink well, and in recording the ink is drawn through this feed pipe and into the stylus, against the action of capillary attraction in the feed pipe by the molecular cohesion of the liquid and its adhesion to the film which wets the paper. The tension screw 12 may be adjusted according to the conditions of service of the instrument. In cases where considerable vibration is met with, as on trolley cars and the like, the screw is slackened until the pen rests on the paper thus preventing jumping of the stylus. In cases where no serious vibration is met with, the spring is put under tension so as to just leave the stylus clear of the paper, permitting no contact between the two except through the very short column or film of ink. Thus there is almost no mechanical resistance to deflection of the measuring arm. The latter is secured to the armature 17 which carries one of the control coils 17$^a$ of the instrument. This coil in the present type of instrument is shown as excited by a local source of constant potential, as for example a storage battery, and includes in its circuit an adjustable resistance 18, connection being made with the armature coil through flexible conducting spirals 19—19$^a$ (see Fig. 5). In this same circuit are included the coils 20—20$^a$ of the damping magnet provided with tapered poles, as indicated at 21—21$^a$ in Fig. 10 and mounted so that they may be adjusted angularly relatively to one another. Thus two confronting pole faces may be adjusted so as to provide limiting planes to the air gap coextensive with the area of the pole tips, or less than this extent of surface by shifting them at an angle to one another, as indicated in Fig. 10, or both may be shifted as a unit; or only one need be wedge-shaped, the other being of circular face. Thus the damping effect may be delicately and nicely graduated by shifting the poles to different angles, the gap directly across from face to face being the path of least reluctance and the flux through the other portions of the pole faces being forced to traverse a path of higher reluctance when the poles are shifted to angular relative planes. Within this damping field moves a metal arm 22 which is connected by thin bars of metal with the rest of the movable member. The whole movable arm may be made from a single piece as far as the hinged joint, being struck from sheet metal. This type of mounting gives an excellent dead-beat action, and is a marked feature of improvement.

Another feature of importance in my invention is the mode of suspension of the armature shaft and the zero-seeking element. This is indicated in Figs. 7 and 8, where a stout helical spring 23 is secured at one end to a fixed post forming a rigid part of the frame of the instrument, and at the other end to the armature shaft. The lower end of the shaft hangs freely in a cylindrical bearing; an adjustable stop 23$^a$ being provided to prevent excessive vibration of the axis. A set-screw 24 or other means of adjusting the zero of the measuring arm may be used. The spring acts both as a support and furnishes the zero-seeking torque.

In series relation to the circuit which includes the damping magnet and one of the coils of the instrument is an adjustable resistance 18 by which the instrument may be set for different capacities of current. Current may be led into the movable coil 17$^a$ through the insulated binding post 25. The armature is provided with an iron core 26 laminated transverse to its axis which increases the torque of the instrument and is found on trial not to give trouble from hysteresis. The field coils 17$^b$ have air cores. With this construction, with a source of constant potential, such for example as a storage battery connected in one circuit of the measuring instrument, and the source whose fluctuations are to be measured on the other, the measuring arm will take a position depending on the energy or energy component in the circuit to be measured and in being deflected will leave a colored trace due to the ink on the paper as the latter is drawn forward under the action of the motor.
In order to gage the time at any given stage of the record, an electro-magnet 27 is mounted on the frame which carries the drum, its armature carrying a small ink pot 28 and a capillary pen 29. When the armature is energized by closure of the circuit through a clock-controlled circuit closer exterior to the device, any suitable form of which may be employed, the pen 29 is drawn across the paper for a short distance so as to leave a projection or trace in ink, and as these projections occur every second or at any other desired interval, the time of any point of the measured curve is indicated.

What I claim as new and desire to secure by Letters Patent of the United States, is,

1. An electrical recording instrument having stationary and movable elements, one excited by a source of constant potential and the other by the current or energy to be measured, a damping magnet in circuit with the constant source, a conductor carried by the movable element and cutting the field of the magnet, a flexible jointed recording arm also secured to the movable element, a recording pen having a siphon capillary feed carried by the arm, and means for supporting a recording surface in coöperative relation to the pen.

2. An electrical recording instrument having a moving element suspended by a spring and comprising an armature, a flexible jointed arm, and a recording pen having a siphon capillary feed carried by said arm, field coils for coöperation with said armature, and means for supporting a recording surface beneath the pen.

3. An electrical recording instrument having a moving element suspended by a spring and comprising an armature, a flexible arm, and a recording pen having a siphon capillary feed carried by said arm, an adjustable stop for preventing excessive vibration of the moving element, field coils for coöperation with said armature, and means for supporting a recording surface beneath the pen.

4. In an electric recording instrument, a recording arm having a stylus secured thereto, an ink well for supplying said stylus, and a tube with one end secured to said stylus and the other end bent to enter the ink well, said tube and ink well being relatively movable to permit withdrawal of the tube from the ink well.

5. In an electrical recording instrument, a recording arm having a stylus, means for removably securing said stylus to said arm, an ink well carried by said arm, and a tube bent to pass over the edge of the ink well to bring one end near the bottom of said well and having the other end secured to said stylus.

6. In an electric recording instrument, a controlling device comprising an inner element having a core of good magnetic permeability and a coil thereon, and an outer element consisting of a coil having an air core, said elements being relatively movable, a flexible jointed recording arm secured to the movable element, a pen carried by the arm, and means for supporting a recording surface in coöperative relation to the pen.

7. In an electric recording instrument, a controlling device comprising an inner element having a core of good magnetic permeability laminated in the direction of magnetic flux, and an outer element consisting of a coil having an air core, said elements being relatively movable, a jointed recording arm secured to the movable element, a stylus carried by the arm, and means for supporting a recording surface out of contact with the stylus except through a film of fluid.

8. In an electric recording instrument, a controlling device comprising an inner element having a core of good magnetic permeability and a coil thereon, and an outer element consisting of a coil having an air core, said elements being relatively movable, a flexible recording arm secured to the movable element, a pen carried by the arm, means for supporting a recording surface in coöperative relation to the pen, and a magnetic damper comprising a conductor carried by the movable element and magnets whose pole tips are oblong and angularly adjustable whereby the field strength may be varied.

9. In an electrical recording instrument, a recording arm in two parts hinged together one part being a prolongation of the other and provided with an adjustable spring which holds the outer part yieldingly.

10. In an electrical recording instrument, a recording arm in two parts hinged together, one part being a prolongation of the other and provided with an adjustable spring which holds the outer part yieldingly, and a recording pen having a siphon capillary feed carried by the outer part.

11. In an electrical recording instrument, a recording pen having a stylus, an ink well, and a capillary tube acting as a siphon to feed ink from the well to the stylus, said stylus having a counter bore of relatively large diameter between its tip and its connection with the tube, and a tapering removable plug in the counterbore.

12. An electrical recording instrument having a moving element and a damper coöperating therewith, said damper comprising a conductor attached to the moving element and cutting the field created by magnets having coaxial opposing pole pieces of such shape that the strength of the magnetic field may be varied by relative axial rotation of the pole pieces.

13. In a damper for electrical recording instruments, magnets arranged coaxially and having pole pieces of such shape that their rotation with relation to each other varies the reluctance of the path between them.

In witness whereof, I have hereunto set my hand this 26th day of September, 1902.

LEWIS T. ROBINSON.

Witnesses:
    G. C. HOLLISTER,
    HELEN ORFORD.